United States Patent [19]

Sing

[11] Patent Number: 4,849,822
[45] Date of Patent: Jul. 18, 1989

[54] METHOD AND APPARATUS FOR ELECTRONIC PAGE COMBINATION FOR REPRODUCTION TECHNOLOGY

[75] Inventor: Gerhard Sing, Schoenkirchen, Fed. Rep. of Germany

[73] Assignee: Dr. Ing. Rudolf Hell GmbH, Kiel, Fed. Rep. of Germany

[21] Appl. No.: 153,826

[22] PCT Filed: May 1, 1987

[86] PCT No.: PCT/DE87/00194
§ 371 Date: Dec. 17, 1987
§ 102(e) Date: Dec. 17, 1987

[87] PCT Pub. No.: WO87/06789
PCT Pub. Date: Nov. 5, 1987

[30] Foreign Application Priority Data

May 2, 1986 [DE] Fed. Rep. of Germany ....... 3614790

[51] Int. Cl.⁴ ............................................. H04N 1/40
[52] U.S. Cl. .................................. 358/443; 364/523; 340/802
[58] Field of Search ......... 358/200, 183, 22, 256, 296, 358/300, 302; 364/523; 340/802

[56] References Cited

U.S. PATENT DOCUMENTS 4,476,497 10/1984 Oshikoshi et al. .................. 358/298

FOREIGN PATENT DOCUMENTS 2827596 2/1980 Fed. Rep. of Germany .
3223730 2/1983 Fed. Rep. of Germany .
2505518 11/1982 France .
2123647 2/1984 United Kingdom .

Primary Examiner—E. A. Goldberg
Assistant Examiner—L. Donovan

[57] ABSTRACT

A method for electronic page montage for reproduction technology with recording of the pages on a recording medium by means of a recorder which comprises a multi-track recording element whose resolution is finer than the resolution of the image information, whereby, before the recording, the entire end page is divided into sub-areas within which the image information are to be recorded with the recorder in accord with a layout.

8 Claims, 3 Drawing Sheets

PATENT NUMBER 4,849,822

METHOD AND APPARATUS FOR ELECTRONIC PAGE COMBINATION FOR REPRODUCTION TECHNOLOGY

BACKGROUND OF THE INVENTION

1. Field of the Invention

The present invention is directed to a method and to an apparatus for electronic page montage for reproduction technology, whereby the recording of the individual pages on a recording medium occurs with a recorder which comprises an electronic screening unit having a multi-track recording element with a resolution which is finer then the resolution of the image information, whereby, before recording, the entire end page is divided into sub-areas within which various motifs, such as image, text or artificially generated image information respectively supplied from different signal sources are recorded according to a layout, and are recorded with the recorder having the finer resolution.

2. Description of the Prior Art

In reproduction technology, combinations of images, letterings, signets, etc., are composed to form an end page having arbitrary arrangement and overlap according to a layout. Other than in a conventional way, such combinations were previously only executed off-line with full electronic systems, involving considerable time expenditure, whereby the individual images or text parts are present completely stored and are individually transferred into a short-time memory according to the layout. In this respect, for example, see DE-A No. 33 42 947 or DE-C No. 21 61 038 (Equivalent UK No. 1,407,487). How such combinations are implemented in detail may be seen, for example, in DE-C No. 21 37 676 (which is equivalent to U.S. Pat. No. 3,904,816).

DE-A No. 32 23 730 (which is equivalent to U.S. Pat. No. 4,496,989) discloses a method for composing and reproducing a picture and a letter using image signals and letter signals for application in an image reproducing machine wherein a switching between image signal and script signal occurs. An electronic screening unit comprising a multi-track recording element having a plurality of write tracks is provided, the individual screen points being generated during image recording such that the individual write tracks of the multi-track recording element are separately driven. Such a screening unit is also disclosed, for example, in DE-A No. 21 07 738 (equivalent to U.S. Pat. No. 3,725,574).

The screening unit of FIG. 8 in DE-A No. 32 23 730 (which is equivalent to U.S. Pat. No. 4,496,989) is composed of a control unit in which drive signals for the individual write tracks are generated, these drive signals determining whether the light beam of a write track is turned on. The image information is reproduced by screen points which are formed as a coherent spot composed of a plurality of parallel write tracks The text information is recorded in that the individual write tracks are trace-unblanked and blanked at the contours of the letters for generating the letters. In order to obtain a combination of text and image information, OR gates are provided in the control lines which extend from the control unit to the individual write tracks. Dependent on the drive of these OR gates, thus, screen points or pure black-and-light information are recorded by the recording element. To this end, one group of the inputs of the OR gates are connected to the control unit of the screening unit; the other group of inputs of the OR gates supplies the text information. Dependent on which group of inputs is activated, thus, image or text is recorded.

The time when the OR gates switch determines the topical limitation between the image parts and text parts. With this circuit arrangement, thus, it is only possible to select between a text and an image or, respectively, an image part since the OR gates only allow these two selection possibilities.

In reproduction technology, however, there is often a desire to switch not only between an image and text, but it is frequently required to combine a plurality of images or image parts with a plurality of text parts or individual letters or texts having image content, gradation information or with constant tint value. This, however, is not possible with the arrangement disclosed in DE-A No. 32 23 730.

It is also known from "Druckwelt", November 1985, Pages 45 and 46, to undertake an image-text processing and whole-page recording with image-text systems. Images and text of a previously completely designed page are brought onto a line, i.e. onto a scan line, with microprocessors by parallel processing, this line being recorded by means of a laser setter. With the assistance of what is referred to as a layout programmer, the apparatus "Layout Programmer LP307" of Dr.-Ing. Rudolf Hell GmbH, Kiel, Federal Republic of Germany in the present case, layout and scan parameters are acquired and portrayed on a monitor. The disadvantage of this system is that the layout data, determined by the resolution, have the same resolution of the scanned image information, this leading to a stepping at the contours between two image details in the image combination within the end page. Further, only rectangular masks within the layout can be produced with this system, it following therefrom that the system is limited both in terms of quality and in terms of the geometry of the masks.

SUMMARY OF THE INVENTION

It is therefore the object of the invention to specify a method and an apparatus for electronic page combination with which an arbitrary plurality of images, texts or other graphics or, respectively, image parts, text parts or signets can be composed according to a layout in arbitrary form.

The invention achieves this by the features recited in the characterizing part of claim 1. Advantageous developments of the invention are recited in subclaims 2–8.

BRIEF DESCRIPTION OF THE DRAWINGS

The invention shall be set forth in greater detail below with reference to FIGS. 1–3. Shown are:

FIG. 1 an example of a page composed of image and text;

DESCRIPTION OF THE PREFERRED EMBODIMENTS

FIG. 1 shows a page that is composed of a plurality of text parts and image parts. A plurality of motifs $M_1$, $M_2$, $M_3$ and $M_4$ are present. Let the background of the motifs have the density $d_1$, the script segment "HELL" have the density $d_2$ and the field in which the signet "HELL" lies have the density $d_1$. Instead of the density $d_2$, a motif could also appear as background in the lettering "HELL". Moreover, a print block is present in the upper left-hand corner. As may be seen from this example, the motifs overlap and the layout defines the individual regions and the positions of the individual parts from which the final page is composed.

In order to then be able to execute such combinations in practice, an apparatus shall be set forth below with reference to FIGS. 2 and 3 which can be very flexible and quickly realized in on-line operation. A known recorder for recording color separations is thereby equipped with a means which allows contours defined by form and position within the end page to have a controlling influence on the image information to be recorded. The geometrical resolution of the contour control information is thereby greater by a multiple than the geometric resolution of the input image information, separated both in feed direction as well as in circumferential direction.

What is meant by contour information in the present invention are data which specify the position and bounding of an image part or text part within the page, namely, in a resolution which is significantly finer than the resolution of the scanned information, but which is separated from the image information. Such contour data can be acquired in various ways, for example, via an input station for geometry, i.e. layout, via an input station for print codes or via an input station for stroke information. This acquisition of the contour data is also referenced AV, i.e. work preparation, with specific devices having been developed for this purpose. For example, the device, Layout Programmer LP 307, order number 2121 (1d-S-8702) of Dr.Ing. Rudolf Hell GmbH, Kiel, Federal Republic of Germany, is referenced for layout input. What are referred as "composings" can be acquired with this device, extensive montage jobs being executed to that end. Many individual photos are combined into such a composing for catalog design, to which end geometrical figures having an arbitrary shape can be generated or color areas can be set up with a digitizer upon picture screen display.

A further possibility of acquiring contour data can be an input station for script or an input station for stroke, for example, for scanning signets or other stroke information.

Figure 2:
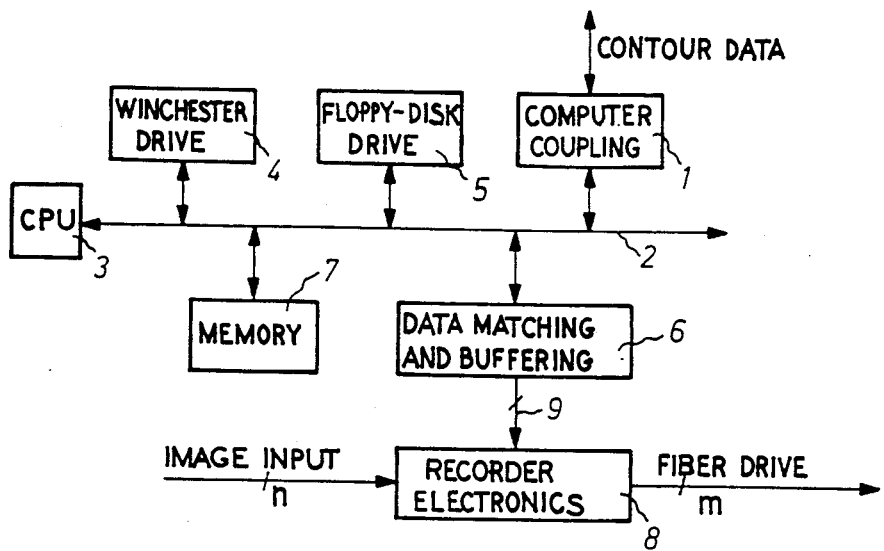
FIG. 2 a block circuit diagram of a recorder for producing page combinations.

FIG. 2 shows a fundamental structure of such a contourable recorder unit. The contour data can be input to the recorder via a transportable storage medium, for example, a floppy disc which can also serve the purpose of archiving the contour data or can be input via a directly wired computer coupling from the control processors of the AV station.

FIG. 2 shows such a computer coupling 1 which is connected to a bus system 2 which is in turn controlled by a central processor unit (CPU) 3. Via the bus 2, the central processor controls the computer coupling 1, a disc drive (Winchester drive) 4, a floppy disc drive 5 and a unit 6 for data matching to the recorder electronics 8 which additionally undertakes a data buffering and is connected to the recorder electronics via a multiple line 9. A memory 7 is also provided which contains the program of the central processor 3. The contour data proceed from the computer coupling 1 or from the floppy disc 7 to the disc drive 4.

From there, the contour data are output processor-controlled via the data matching unit 6. The chronological decoupling of the processor speed from the recorder electronics on the basis of elastic buffering is also executed in the data matching unit, so that a synchronization of the output data of the data matching unit to the recording speed of the recorder is established.

In the exposure event, the combination composed of the disc drive 4, of the CPU memory 7 and of the data matching unit 6 represents a multi-stage FIFO (first in, first out). The contour data are composed of run lengths in feed direction of the recorder, of run lengths in circumferential direction of the recording drum of the recorder, and of control data which indicate which signal source is to be recorded. Feed direction and circumferential direction of the recording drum in a drum recorder correspond to the x, y-coordinates of the recording medium given a recorder having flat bed recording. The contour data proceed from the disc drive 4 to the memory 7, whereby the decoding of the feed run lengths occurs on the basis of a program. The decoding of the circumferential run lines occurs hardware-wise with a decoder in the data matching unit. This type of processing of run lengths is known in setting technology when setting characters, and for the reason it shall not be discussed in detail herein.

Figure 1A:
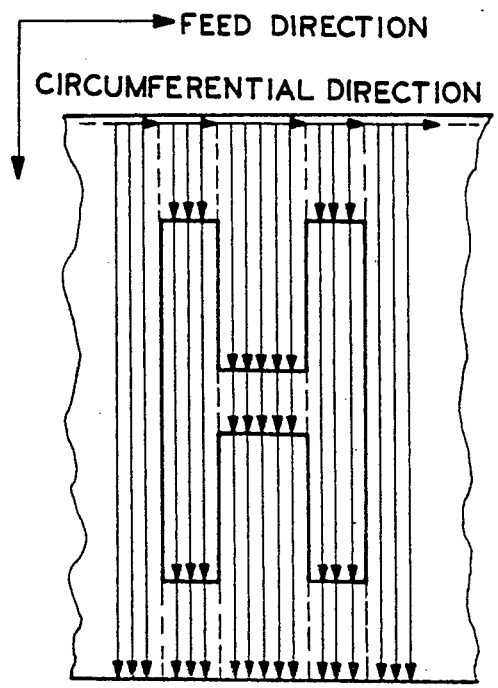
FIG. 1a an example for the resolution of a character in contour data.
Figure 1B:
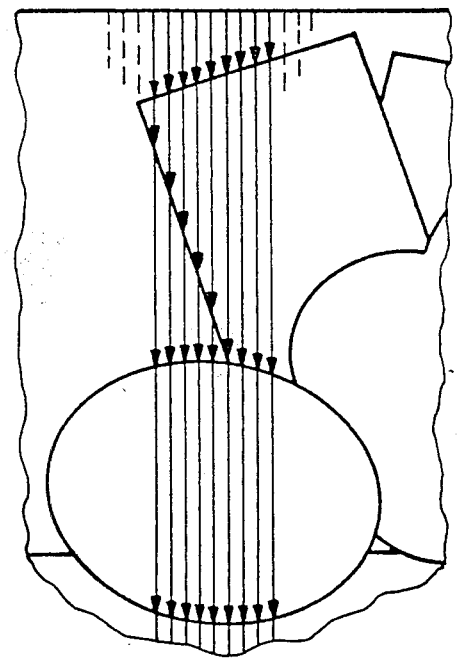
FIG. 1b an example of the resolution of picture parts in contour data.

With reference to the example of the letter "H" from the signet of FIG. 1, FIG. 1a shows how a character is divided into such run lengths. The feed direction of the recording is indicated in the horizontal in FIG. 1a and the circumferential direction of the recording is indicated in the vertical. However, the directions can also be inversely defined. As may be seen from FIG. 1a such a character or, as shown in FIG. 1b, an image can also be divided into run lengths. As may be seen from FIG. 1b, the feed length is respectively 1 given contours occurring obliquely relative to the feed direction, whereby the feed run length is always of a length lasting until the next information change occurs given contours which proceed in the feed direction.

As result of the decoding, the information changes are present in circumferential direction, i.e. the run lengths are present along a circumferential line, whereby every run line is affected with an information as a result of the control information, this information indicating which motif is to be respectively recorded, i.e. which information source is allocated to this circumferential line.

Figure 3:
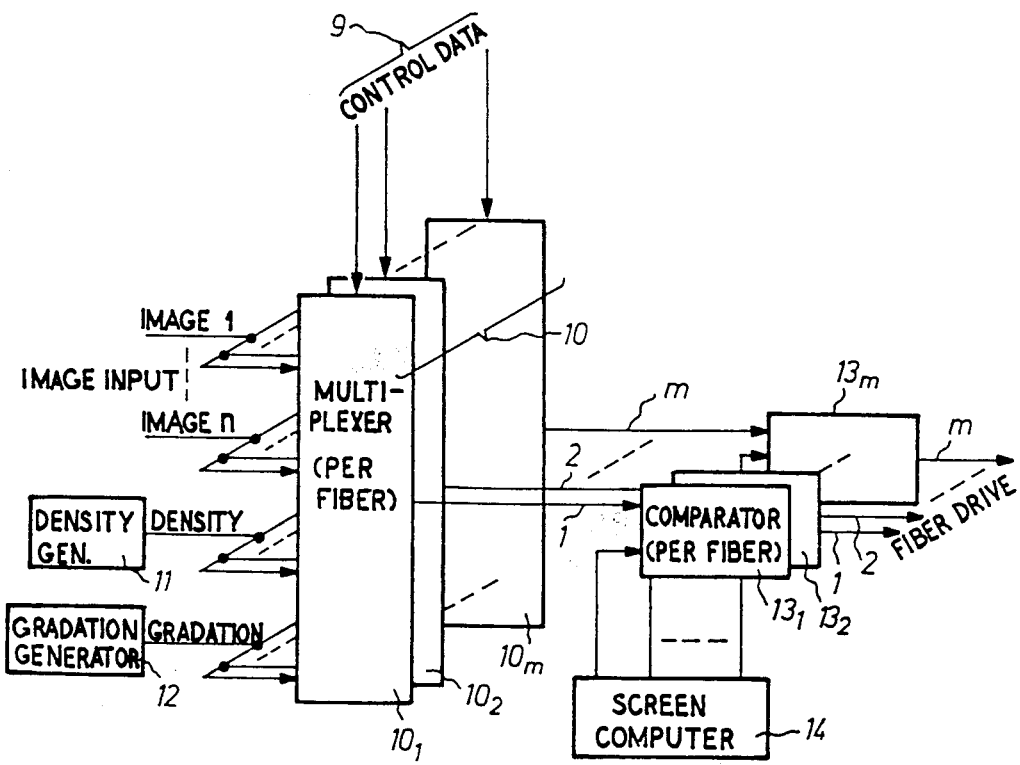
FIG. 3 a circuit arrangement for the implementation of the invention.

In FIG. 2, the recorder electronics is only shown as a single block comprising n image inputs and m outputs, but it is shown in greater detail in FIG. 3.

In FIG. 3, the control data for the recorder electronics proceed via the multiple line 9 to a multiple multiplexer 10 which maximally comprises the same number of multiplexers $10_1$ through $10_n$ as the number of write tracks of the multi-track recording element. In case the individual write tracks are fashioned as controllable light guides, as in DE-A No. 21 07 738, every fiber is individually driven.

Every multiplexer $10_1$ through $10_m$ [sic] can comprise an arbitrary plurality of inputs, i.e. can comprise the same number of inputs as information signal sources which are to be combined with one another. In the present case, there are 1−n image inputs, whereby no distinction is made between image information, text information or stroke information, so that every one of the 1−n inputs can be charged either with image information, text information or stroke information.

However, individual inputs can also be permanently allocated, this, for example, being illustrated in FIG. 3, such that one input which is specifically provided for density specifics is permanently connected to a density generator 11 and another input is permanently connected to a gradation generator 12. However, the density generators or, respectively, the gradation generator can just as well be connected to the other image inputs 1−n or vice versa. As may be seen therefrom, the method is extremely flexible as regards the combination of the input information since every run length in circumferential direction can have each of the input information sources allocated to it.

The outputs of the multiplexers $10_1$ through $10_n$ form the inputs for the screening unit as disclosed, for example, in DE-C No. 28 27 596 (equivalent to U.S. Pat. No. 4,499,489). The screening unit comprises a comparator ($13_1$ through $13_m$ for every recording track, this comparator being connected to the screen computer 14. The comparators $13_1$ through $13_m$ compare their input signal to a screen signal that is generated by the screen computer 14, whereby a decision whether the allocated recording track is trace-unblanked or blanked is made on the basis of the comparison. Instead of the optical fibers, of course, other multi-track recording elements can also be employed, thus, for example, acousto-optical modulators, whereby the comparator then decides whether the individual sub-rays of the modulator are trace-unblanked or blanked.

A plurality of image inputs corresponding to a defined plurality of images to be combined on the end page need not be present at the recorder. On the contrary, the same result can be achieved by multiple, successive exposure events—whereby the elemental surfaces yet to be exposed are respectively left free, as in a method known for rectangular image portions.

The combination of an arbitrary plurality of images, densities and gradations with arbitrary contours to form an end page is thus possible on-line with exposure speed without cost-intensive whole-image storing of the end pages.

Of course, combinations of images or texts which are already finished can likewise be in turn combined with other image information, text information or stroke information since an arbitrary plurality of multiplexer inputs can be provided. As already mentioned, the combination can also ensue on the basis of multiple exposure.

It should also be noted that the resolution of the contour data according to the run lengths shown in FIGS. 1a and 1b need not be the same as in the write tracks of the multi-track recording element; however, the ratio must be a whole number. A matching to the plurality of write tracks can be carried out by the processor 3.

I claim:

1. A method for electronic page montage for reproduction technology using recording of pages on a recording medium by means of a recorder which comprises an electronic screening unit having a multi-track recording element which has a resolution for recording screen points that is finer than the resolution of scanned image information, wherein, prior to the recording of an entire page, the page montage is divided into sub-areas in which images, texts or artificially generated image information are recorded with the recorder according to a layout, characterized in that acquiring the layout as contour data with a resolution which is finer than the image resolution, whereby the contour data are composed of control data and geometry data which, first, specify which signal source is to be recorded and also geometrically determine where the individual control data are to take effect within the end page of the page montage in accord with the layout, using the geometry data which has the resolution of the contour data to cover the control data into a chronological sequence which is synchronized with the recording speed of the recorder, wherein the chronological sequence of the control data determines which signal source is to be recorded at which location; applying the chronological sequence of the control data to the multi-track recording element, wherein the respective signal source supplies density values to the multi-track recording element, these density values having a resolution which corresponds to the resolution of the image scanning; and supplying the density value from the respective signal source and comparing it to the screen information for every recording track in the screen resolution of the multi-track recording element, whereby the output signals of the comparisons supply the exposure signals.

2. A method according to claim 1, characterized in providing a plurality of multiplexers; in that the chronological sequence of control data for every multiplexer comprises a control signal which connects the individual multiplexer input through to the screening unit for every location of the recording surface according to the allocation of the signal sources to the individual image areas of the end page, whereby the signal source which corresponds to the appertaining sub-area within the layout is through-connected at every time for every recording element of a write track.

3. A method according to claim 1 or 2, characterized in providing one or more computer means for converting the contour data which are composed of geometry data and control data into the chronological sequence of control signals for the multiplexers.

4. A method according to claim 1 or 2, characterized in providing one or more computer means for converting the layout data into contour data which are composed of geometry data and control data as well as for converting the contour data into the chronological sequence of control signals for the multiplexers.

5. A method according to claim 3, characterized in connecting the computer means to the multiplexer via a data buffer which is controlled such by a processor such that the output rate of the data buffer is matched to the input rate of the recorder.

6. Apparatus for electronic page montage for reproduction technology comprising a layout acquisition means and a recorder which comprises an electronic screening unit having a multi-track recording element whose screen resolution is finer than the resolution of scanned image information, wherein the electronic screening unit is composed of a screen calculator and of a plurality of comparators equal in number to the number of write tracks comprised by the multi-track recording element, characterized by a processor for driving the recorder in which the layout information supplied by the layout acquisition means which are present as contour data in the form of geometry data and control data at a resolution which is finer than the image resolution are converted into a chronological sequence of control data at the same resolution as the contour data;

a data matching and buffer means for matching the sequence of control data supplied by the processor to the recorder input control and for data buffering of the control signals supplied from the processor to the working speed of the recorder;

a preceding multiplexer unit in the recorder input of the screening unit comprising the same number of multiplexers as the resolution of the contour data, whereby every mutliplexer comprises a plurality of inputs equal to the number sources required for the electronic page montage, wherein the control data supplied by the processor for every recording track determines which multiplexer input, i.e. which data source, is respectively connected through from the multiplexer to a recording track, and wherein a comparator in the screening unit between the respective multiplexer output signal and a screening signal determines whether the appertaining track of the multitrack recording element is switched on or not.

7. Apparatus according to claim 6, characterized in that the processor is in communication with a data bus to which an input unit for the layout information, a memory for the process control and storage of the incoming layout information and a data matching and buffering unit for the recorder are connected.

8. Apparatus according to claim 6 or 7, characterized in that a screening unit is employed as an electronic multi-track screening unit.

* * * * *